United States Patent
Choi et al.

(10) Patent No.: US 10,921,889 B2
(45) Date of Patent: Feb. 16, 2021

(54) TOUCH SENSITIVE ELEMENT AND DISPLAY DEVICE COMPRISING THE SAME

(71) Applicant: LG Display Co., Ltd., Seoul (KR)

(72) Inventors: Seulgi Choi, Incheon (KR); Yong-Su Ham, Seoul (KR); Taeheon Kim, Seoul (KR); YongWoo Lee, Goyang-Si (KR); Kyungyeol Ryu, Goyang-Si (KR); YuSeon Kho, Seoul (KR); MyungJin Lim, Goyang-Si (KR)

(73) Assignee: LG Display Co., Ltd., Seoul (KR)

( * ) Notice: Subject to any disclaimer, the term of this patent is extended or adjusted under 35 U.S.C. 154(b) by 152 days.

(21) Appl. No.: 15/798,151

(22) Filed: Oct. 30, 2017

(65) Prior Publication Data
US 2018/0120941 A1 May 3, 2018

(30) Foreign Application Priority Data
Oct. 31, 2016 (KR) .......... 10-2016-0143826

(51) Int. Cl.
*G06F 3/01* (2006.01)
*G06F 3/041* (2006.01)
(Continued)

(52) U.S. Cl.
CPC .......... *G06F 3/016* (2013.01); *G02F 1/13338* (2013.01); *G06F 3/041* (2013.01); *G06F 3/0412* (2013.01); *G06F 3/0443* (2019.05); *G06F 3/0445* (2019.05); *G02F 2201/503* (2013.01); *G06F 2203/04103* (2013.01); *G06F 2203/04112* (2013.01)

(58) Field of Classification Search
CPC .......... G02F 1/13335; G02F 1/13338
See application file for complete search history.

(56) References Cited

U.S. PATENT DOCUMENTS 6,313,401 B1 * 11/2001 Triller .......... H01L 41/053
174/521
10,318,091 B2  6/2019  Lee et al.
(Continued)

FOREIGN PATENT DOCUMENTS

CN    1955828 A    5/2007
CN    103616097 A    3/2014
(Continued)

OTHER PUBLICATIONS

Taiwan Intellectual Property Office, Office Action, TW Patent Application No. 106137242, dated Jun. 29, 2018, eight pages.
(Continued)

*Primary Examiner* — Thanh Nhan P Nguyen
(74) *Attorney, Agent, or Firm* — Fenwick & West LLP

(57) ABSTRACT

Provided are a touch sensitive element and a display device including the same. According to the exemplary embodiment of the present disclosure, a touch sensitive element, includes: an electroactive layer which is formed of electroactive polymer (EAP); an electrode which is disposed on at least one surface of the electroactive layer; and a hard coating layer which is disposed on the electroactive layer and the electrode and has a negative coefficient of thermal expansion (CTE). Therefore, vibration effect in a vertical direction is maximized and impact resistance may be improved.

15 Claims, 8 Drawing Sheets

(51) Int. Cl.
*G06F 3/044* (2006.01)
*G02F 1/1333* (2006.01)

(56) References Cited

U.S. PATENT DOCUMENTS

| | | | |
|---|---|---|---|
| 2013/0105852 A1* | 5/2013 | Lou | H01L 33/62 |
| | | | 257/99 |
| 2013/0119352 A1* | 5/2013 | Aurongzeb | H01L 51/5225 |
| | | | 257/40 |
| 2015/0169118 A1 | 6/2015 | Lee et al. | |
| 2016/0041636 A1* | 2/2016 | Yun | G06F 3/044 |
| | | | 349/12 |
| 2016/0185915 A1 | 6/2016 | Kim et al. | |
| 2016/0187985 A1* | 6/2016 | Lim | G06F 3/016 |
| | | | 345/173 |

FOREIGN PATENT DOCUMENTS

| | | |
|---|---|---|
| CN | 104714688 A | 6/2015 |
| CN | 105739747 A | 7/2016 |
| EP | 2700997 A1 | 2/2014 |
| EP | 3040388 A1 | 7/2016 |
| EP | 3041058 A1 | 7/2016 |
| JP | 2005264135 A | 9/2005 |
| JP | 2006190959 A | 7/2006 |
| KR | 10-2011-0083451 A | 7/2011 |
| KR | 10-2013-0059125 A | 6/2013 |
| KR | 10-2013-0089211 A | 8/2013 |
| TW | 201320253 A | 5/2013 |
| TW | 201624230 A | 7/2016 |

OTHER PUBLICATIONS

European Search Report for European Patent Application No. EP 17199473, dated Feb. 15, 2018, 8 Pages.
China National Intellectual Property Administration, Office Action, CN Patent Application No. 201711041221.3, dated Jun. 29, 2020, 17 pages.

* cited by examiner

TOUCH SENSITIVE ELEMENT AND DISPLAY DEVICE COMPRISING THE SAME

CROSS-REFERENCE TO RELATED APPLICATIONS

This application claims the priority of Republic of Korea Patent Application No. 10-2016-0143826 filed on Oct. 31, 2016, in the Korean Intellectual Property Office, the disclosure of which is incorporated herein by reference.

BACKGROUND

Field

The present disclosure relates to a touch sensitive element, a display device including the same, and a manufacturing method thereof, and more particularly, to a touch sensitive element with an improved vibration level and a display device including the same.

Description of the Related Art

Recently, in response to a demand of users who want to use various display devices including a liquid crystal display device and an organic light emitting display device, a touch type display device which touches a display device to input information is broadly used. Therefore, researches continue to utilize a haptic device to provide direct and various touch feedback to the users. Specifically, a haptic device of the related art is attached on a rear surface of a display panel, so that it is difficult to provide immediate and delicate feedback for the user's touch. Therefore, research is actively performed to provide feedback which is sensitive to the user's touch by positioning the haptic device above the display panel.

According to the related art, a vibration motor such as an eccentric rotating mass (ERM) or a linear resonant actuator (LRA) is used for the display device as a haptic device. The vibration motor is configured to vibrate the entire display device. Therefore, there are problems in that a size of a mass needs to be increased in order to increase a vibration level, it is difficult to modulate a frequency to adjust the vibration level, and a response speed is very slow. Further, the eccentric rotating mass and the resonant actuator are formed of an opaque material so that it is difficult to dispose the eccentric rotating mass and the resonant actuator above the display panel.

In order to solve the above-described problems, a shape memory alloy (SMA) and electro-active ceramics (EAC) have been developed as a material for the haptic device. However, the shape memory alloy (SMA) has a slow response speed and a short life-span and is formed of an opaque material. Further, the electro-active ceramics has a low durability against the external impact so that the electro-active ceramics are easily broken due to an external impact and are opaque. Further, it is difficult to make the electro-active ceramics thinner.

SUMMARY

Therefore, the present disclosure has been made in an effort to provide a touch sensitive element which may implement an excellent haptic effect at a low driving voltage by maximizing a vibration effect of an electroactive layer and a display device including the same.

Further, the present disclosure has been made in an effort to provide a touch sensitive element which is transparent and has excellent surface hardness and a display device including the same.

Objects of the present disclosure are not limited to the above-mentioned objects, and other objects, which are not mentioned above, can be clearly understood by those skilled in the art from the following descriptions.

According to an aspect of the present disclosure, there is provided a touch sensitive element including an electroactive layer which is formed of electroactive polymer (EAP), an electrode which is disposed on at least one surface of the electroactive layer, and a hard coating layer which is disposed on the electroactive layer and the electrode and has a negative coefficient of thermal expansion (CTE), thereby maximizing vibration effect in a vertical direction and improving impact resistance.

According to an aspect of the present disclosure, there is provided a display device including: a display panel and a touch sensitive element above or below the display panel, in which the touch sensitive element includes an electroactive layer formed of an electroactive polymer, an electrode which is disposed on at least one surface of the electroactive layer, and a hard coating layer which is disposed on the electroactive layer and the electrode and has a negative coefficient of thermal expansion.

Other detailed matters of the exemplary embodiments are included in the detailed description and the drawings.

According to the present disclosure, a vibration effect in a vertical direction may be maximized by changing a characteristic of a surface of an electroactive layer and thus an excellent haptic effect may be implemented at a low driving voltage.

Further, according to the present disclosure, the touch sensitive element is transparent and a hardness of the surface is excellent so that impact resistance is improved.

The effects according to the present disclosure are not limited to the contents exemplified above, and more various effects are included in the present specification.

DETAILED DESCRIPTION

Figure 1A:
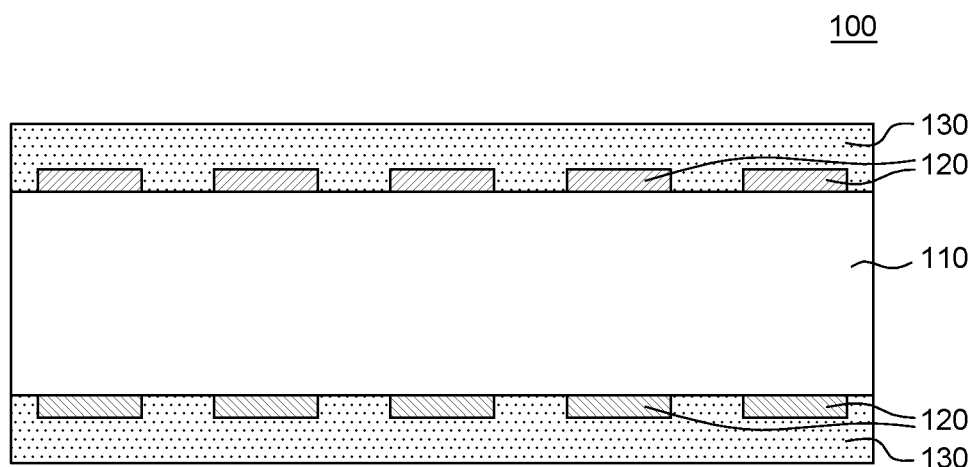
FIG. 1A is a schematic cross-sectional view for explaining a touch sensitive element according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

When an element or layer is disposed "on" other element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely coupled to or combined with each other and can be interlocked and operated in technically various ways, and the embodiments can be carried out independently of or in association with each other.

Hereinafter, various exemplary embodiments of the present disclosure will be described in detail with reference to accompanying drawings.

Figure 1B:
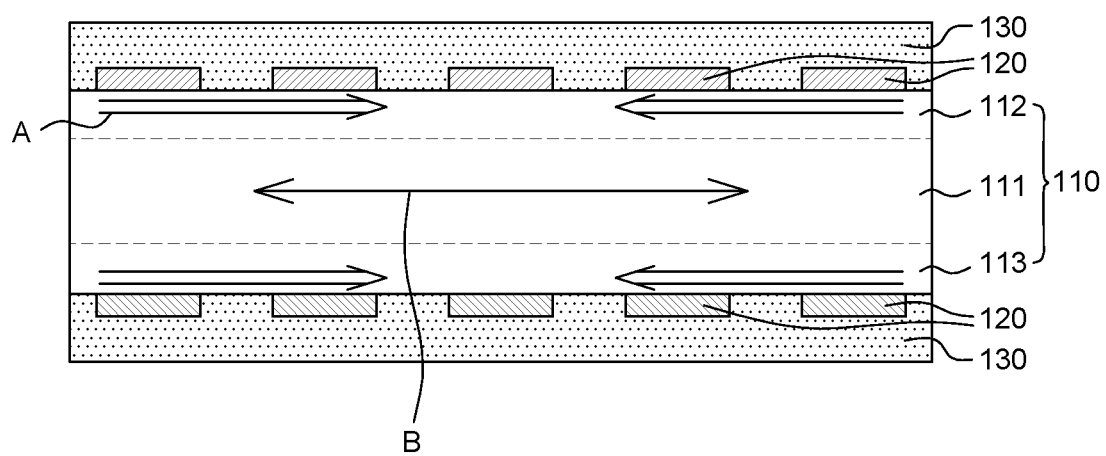
FIG. 1B is a schematic view for explaining compressive force and tensile force generated in an electroactive layer of a touch sensitive element according to an exemplary embodiment of the present disclosure.

FIG. 1A is a schematic cross-sectional view for explaining a touch sensitive element according to an exemplary embodiment of the present disclosure. FIG. 1B is a schematic view for explaining compressive force and tensile force generated in an electroactive layer of a touch sensitive element according to an exemplary embodiment of the present disclosure. Referring to FIGS. 1A and 1B, a touch sensitive element 100 includes an electroactive layer 110, an electrode 120, and a hard coating layer 130.

The electrode 120 applies an electric field to the electroactive layer 110 to induce vibration or bending by an electrical stimulation. The electrode 120 may be disposed to have various shapes and various numbers of electrodes may be disposed as needed. For example, as illustrated in FIG. 1A, a plurality of electrodes 120 may be disposed on an upper surface and a lower surface of the electroactive layer 110 or a plurality of electrodes may be disposed on any one of the upper surface and the lower surface of the electroactive layer 110.

Specifically, electrodes 120 may be disposed on both the upper surface and the lower surface of the electroactive layer 110. In this case, the electrode 120 disposed on the upper surface of the electroactive layer 110 extends in an X-axis direction and the electrode 120 disposed on the lower layer of the electroactive layer 110 extends in a Y axis direction to have a vertical arrangement structure in which the electrodes intersect each other to be disposed in a matrix. Further, a horizontal arrangement structure in which the electrodes 120 are disposed on only one surface of the electroactive layer 110 may be provided. Further, the plurality of electrodes 120 is disposed to be opposite to each other on the upper surface and the lower surface of the electroactive layer 110 in one cell so that a multilayer structure in which both the vertical arrangement structure and the horizontal arrangement structure of the electrode 120 are implemented may be provided.

The electrode 120 is formed of a conductive material. Further, in order to secure light transmittance of the touch sensitive element 100, the electrode 120 may be formed of a transparent conductive material. For example, the electrode 120 may be formed of a transparent conductive material such as indium tin oxide (ITO), indium zinc oxide (IZO), graphene, metal nano wire, and transparent conductive oxide (TCO). Further, the electrode 120 may be formed of a metal mesh. That is, the electrode 120 is formed of a metal mesh in which a metal material is disposed to have a mesh type so that the electrode 120 may be configured to be substantially transparently visible. A constituent material of the electrode 120 is not limited to the above-described example, but various transparent conductive materials may be used for the constituent material of the electrode 120. When a plurality of electrodes 120 is configured, each of the electrodes may be formed of the same material or different materials.

The electrode 120 may be formed by various methods. For example, the electrode 120 may be formed on the electroactive layer 110 by a method such as sputtering, printing, and slit coating.

The electroactive layer 110 may refer to a layer which is deformed to generate vibration as a voltage is applied. The electroactive layer 110 is formed of an electroactive polymer (EAP) which is deformed by an electrical stimulation. For example, the electroactive polymer may be dielectric elastomer or ferroelectric polymer. Specifically, the dielectric elastomer may be one or more kinds selected from the group consisting of acrylic-based polymer, urethane-based polymer, and silicon-based polymer, but is not limited thereto. Further, the ferroelectric polymer may be polyvinylidene fluoride-based (hereinafter, PVDF) polymer. The PVDF-based polymer refers to a polymer including a PVDF repeating unit in a main chain of the polymer, and for example, may be PVDF homopolymer or PVDF copolymer.

When the electroactive layer 110 is formed of dielectric elastomer, the dielectric elastomer is contracted or expand by electrostatic attraction (coulombic force) generated as a voltage is applied to the electroactive layer 110 so that the touch sensitive element 100 may be deformed or vibrates. When the electroactive layer 110 is formed of ferroelectric polymer, an alignment direction of a dipole in the electroactive layer 110 is changed as the voltage is applied to the electroactive layer 110 so that the touch sensitive element may be deformed. Since the transmittance of a film type electroactive layer 110 is excellent, the touch sensitive element is attached on a front surface of the display panel to be easily applied to the display device.

In this case, an electroactive polymer which configures the electroactive layer 110 has a positive coefficient of thermal expansion (CTE). The electroactive polymer having a positive coefficient of thermal expansion expands during a heat treatment process. During a process of forming a hard coating layer 130 having a negative coefficient of thermal expansion, a compressive force is applied to a surface of the electroactive layer 110. With regard to this, details of the coefficient of thermal expansion will be described in detail below together with the hard coating layer 130.

In the meantime, a thickness of the electroactive layer 110 may be determined such that the touch sensitive element 100 generates a sufficient vibration with a low driving voltage. For example, the electroactive layer 110 may be 10 μm to 200 μm. When a thickness of the electroactive layer 110 satisfies the above-mentioned range, the touch sensitive element 100 may generate sufficient vibration and lower the driving voltage. This is because when the thickness of the electroactive layer 110 is larger than 200 μm, an excessive driving voltage may be required to drive the touch sensitive element 100.

The hard coating layer 130 is formed on the electrode 120 and the electroactive layer 110. More specifically, the hard coating layer 130 is disposed so as to be in contact with the electrode 120 and the electroactive layer 110 to be disposed on the electrode 120 and also on the electrode active layer 110 in which the electrode 120 is not disposed. The hard coating layer 130 protects an exterior appearance of the touch sensitive element 100 to improve durability and improves hardness of a surface of the electroactive layer 110 to strengthen vibration force which is transmitted from the electroactive layer 110.

The hard coating layer 130 has a negative coefficient of thermal expansion. When the hard coating layer 130 is disposed on the electroactive layer 110, a heat treatment technique which applies heat is generally used after forming a coating layer by applying a coating composition. In this case, when the hard coating layer 130 has a negative coefficient of thermal expansion, compressive force is applied to the surface of the electroactive layer 110 disposed below the hard coating layer 130 so that the hardness of the surface of the electroactive layer 110 is increased. Force which is applied to the electroactive layer 110 when the hard coating layer 130 has a negative coefficient of thermal expansion will be specifically described with reference to FIG. 1B.

FIG. 1B is a schematic view explaining for compressive force and tensile force generated in the electroactive layer 110 of the touch sensitive element 100 according to an exemplary embodiment of the present disclosure. Referring to FIG. 1B, the electroactive layer 110 may be divided into a center portion 111, an upper surface portion 112 located above the center portion, and a lower surface portion 113 disposed below the center portion 111. The upper surface portion 112 and the lower surface portion 113 include arbitrary spaces having a thickness which are disposed on the electroactive layer 110 and the surface and below the surface of the electroactive layer 110 with which the hard coating layer 130 is in contact. In this case, the center portion 111, the upper surface portion 112, and the lower surface portion 113 are obtained by arbitrarily dividing a space, but are not limited to areas illustrated in FIG. 1B.

An electroactive polymer which configures the electroactive layer 110 has a positive coefficient of thermal expansion. Therefore, the electroactive layer 110 has a property of horizontally expanding during the heat treatment process on the hard coating layer 130. Accordingly, the electroactive layer 110 which is subjected to the heat treatment process receives the tensile force B in a horizontal direction from the center of the electroactive layer 110 as illustrated in FIG. 1B. Specifically, the center portion 111 of the electroactive layer 110 receives the tensile force B in the horizontal direction.

Differently from this, the upper surface portion 112 and the lower surface portion 113 of the electroactive layer 110 receive the compressive force A. Specifically, since the hard coating layer 130 has a negative thermal expansion coefficient, the hard coating layer 130 is compressible during the process of performing a heat treatment on the hard coating layer 130. Therefore, the hard coating layer 130 is compressed to the center by the heat treatment process, so that the surface portion of the electroactive layer 110 which is in contact with the hard coating layer 130 also receives a compressible force. That is, the upper surface portion 112 and the lower surface portion 113 of the electroactive layer 110 receive the compressive force A by the hard coating layer 130.

As a result, the hard coating layer 130 is formed so that the center portion 111 of the electroactive layer 110 receives the tensile force B and the upper surface portion 112 and the lower surface portion 113 of the electroactive layer 110 receive the compressive force A. In the upper surface portion 112 and the lower surface portion 113 of the electroactive layer 110 which receive the compressive force A, as compared with the center portion 111, internal storage energy is increased and hardness in a vertical direction of the electroactive layer 110 is also increased. By doing this, vibration force which is transmitted from the center of the electroactive layer 110 to the surface when the electroactive layer 110 vibrates is strengthened. By doing this, even though the same voltage is applied to the electroactive layer 110, the vibration effect may further improved.

As a material which configures the hard coating layer 130, a transparent material having a negative coefficient of thermal expansion may be configured. More specifically, the material which configures the hard coating layer 130 may be a crystalized transparent ceramic material. For example, the material which configures the hard coating layer 130 may be a ceramic material in which silica ($SiO_2$), alumina ($Al_2O_3$), and lithium oxide ($Li_2O$) are crystallized. For example, β-eucryptite (β-$Li_2O.Al_2O_3.2SiO_2$) or β-spodumen (β-$Li_2O.Al_2O_3.4SiO_2$ or β-$Li_2O.Al_2O_3.9SiO_2$) may be used or zirconium tungstate ($ZrW_2O_3$) or hafnium tungstate ($HfW_2O_8$), zirconium molybdate ($ZrMO_2O_8$) or hafnium molybdate ($HfMO_2O_8$) may be used, but the material is not limited thereto.

The hard coating layer 130 may be formed by applying a composition including a ceramic material having a negative coefficient of thermal expansion on the electroactive layer 110 and then sintering the composition through a heat treatment process. In the meantime, the heat treatment process may be subjected to a plurality of cycles of repeatedly treating the low temperature and the high temperature. A stronger compressive force may be applied to the electroactive layer 110 through a plurality of cycles depending on the material which configures the hard coating layer 130.

The hard coating layer 130 is formed above the electrode 120 and the electroactive layer 110. This is because when the hard coating layer 130 is disposed below the electrode 120, that is, disposed between the electrode 120 and the electroactive layer 110, a vibration level of the touch sensitive element 100 is lowered. Generally, since the hard coating layer 130 having a negative coefficient of thermal expansion has a very small permittivity, when the hard coating layer 130 is disposed between the electrode 120 and the electroactive layer 110, the hard coating layer 130 may act to interfere with the vibration of the electroactive layer 110.

Specifically, the hard coating layer 130 may be disposed to cover the surfaces of the electrode 120 and the electroactive layer 110. The hard coating layer 130 needs to be disposed to be in contact with the surface of the electroactive layer 110 to apply sufficient compressive force to the surface portion of the electroactive layer 110 when the hard coating layer 130 is formed and also serve as a protective layer of the touch sensitive element 100.

A thickness of the hard coating layer 130 may be 10 nm to 200 nm. In this case, the thickness of the hard coating layer 130 means a thickness from the surface of the electroactive layer 110 on which the hard coating layer 130 is disposed. When the thickness of the hard coating layer 130 satisfies the above-mentioned range, sufficient tensile force may be applied to the surface portion of the electroactive layer 110 and the hard coating layer may serve as a protective layer having a sufficient hardness within a range that does not interfere with the movement of the entire contact sensitive element 100.

Hereinafter, the present disclosure will be described in detail through the exemplary embodiments. However, the following exemplary embodiments are set forth to illustrate the present disclosure, but the scope of the present disclosure is not limited thereto.

First Exemplary Embodiment

An electroactive layer was formed to have a thickness of 20 um using acrylic-based polymer, and then an upper electrode and a lower electrode were deposited on both surfaces. Thereafter, silica ($SiO_2$) sol, $Al(NO_3)_3 \cdot 9H_2O$, and $LiNO_3$ were mixed and stirred in distilled water for 3 hours, and a PVA solution was added and stirred for 3 hours to prepare a coating composition in a gel state. The prepared coating composition was coated to cover both the electroactive layer and the electrode and then heat-treated at 150° C. for 24 hours to form a hard coating layer with a thickness of 50 nm formed of $LiO_2 \cdot Al_2O_3 \cdot 4SiO_2$ spodumine. In this case, the coefficient of thermal expansion of the hard coating layer was $-0.14 \times 10^{-6}$/° C.

First Comparative Embodiment

The touch sensitive element was prepared by the same method as the first exemplary embodiment except that the hard coating layer was not formed.

Second Comparative Embodiment

Figure 2:
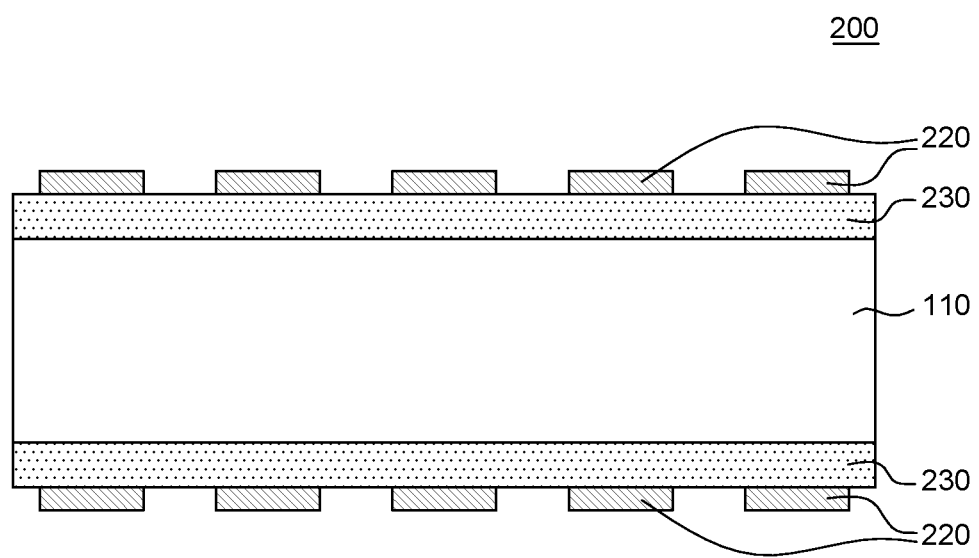
FIG. 2 is a schematic cross-sectional view for explaining a touch sensitive element according to a comparative embodiment of the present disclosure.

FIG. 2 is a schematic cross-sectional view for explaining a touch sensitive element 200 according to a comparative embodiment of the present disclosure. Referring to FIG. 2, a hard coating layer 230 was disposed between an electroactive layer 110 and an electrode 220. The touch sensitive element 200 of FIG. 2 was prepared by the same method as the first exemplary embodiment except that an electrode 220 was deposited after forming the hard coating layer 230 directly on the electroactive layer 110.

Experimental Example 1—Measurement of Vibration Acceleration

In the touch sensitive element according to the first exemplary embodiment, the first comparative embodiment, and the second comparative embodiment, a vibration acceleration when a voltage of 400 V was applied to an upper electrode under a condition of 100 Hz and a ground voltage was applied to a lower electrode was measured. Measurement results were illustrated in FIGS. 3A, 3B, and 3C.

Figure 3A:
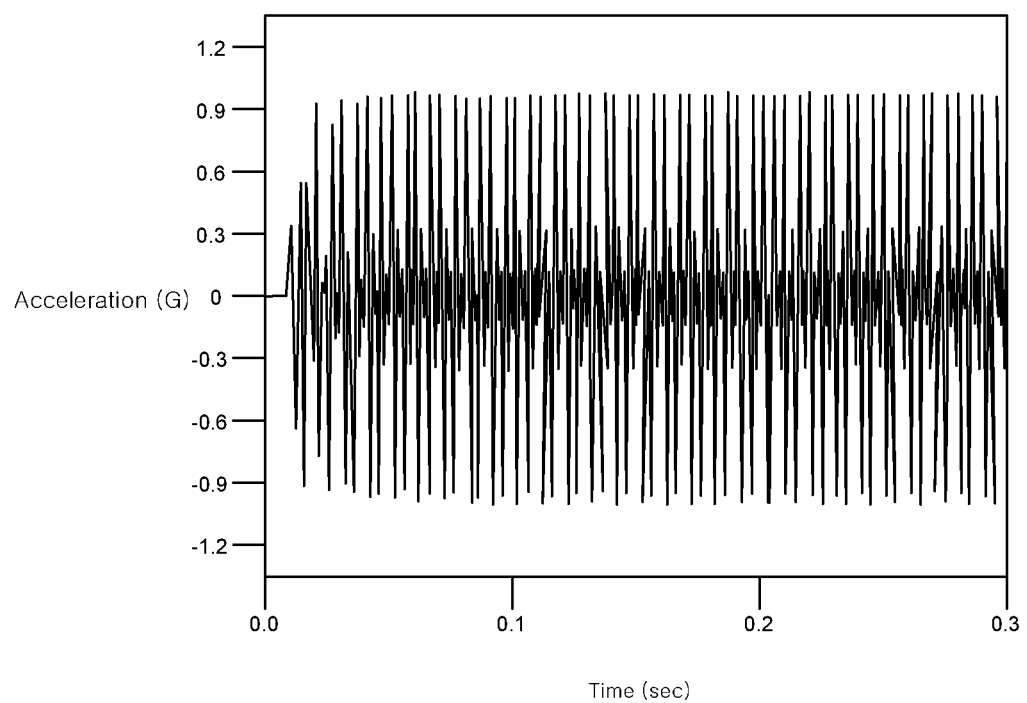
FIGS. 3A, 3B, and 3C are graphs obtained by measuring a vibration acceleration of a touch sensitive element of a first exemplary embodiment, a first comparative embodiment, and a second comparative embodiment.
Figure 3B:
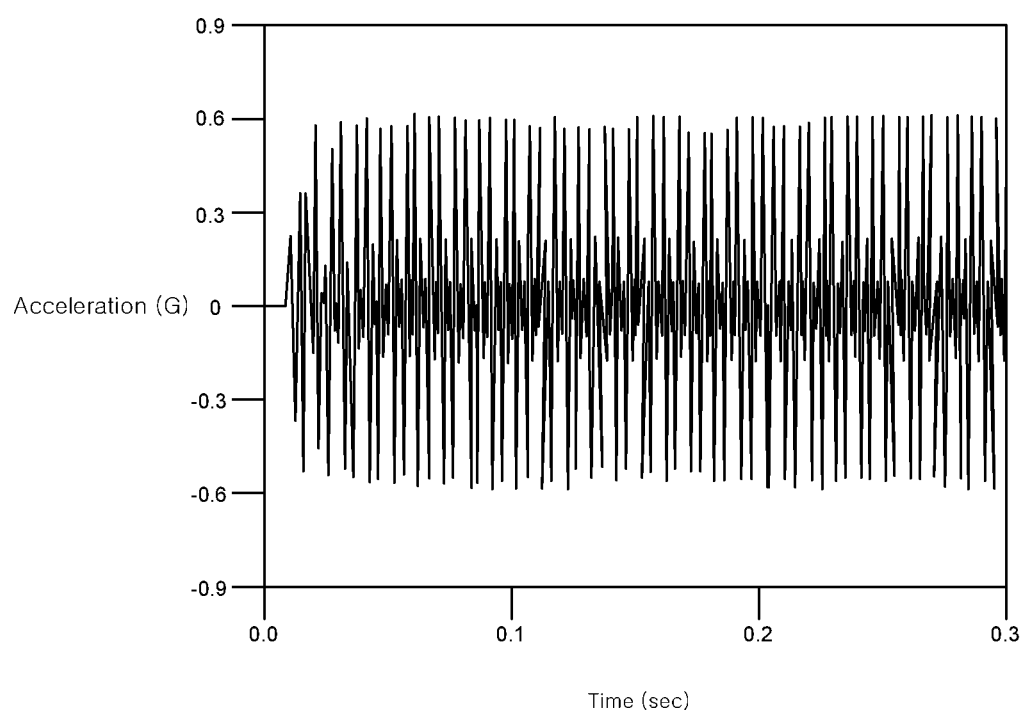
Figure 3C:
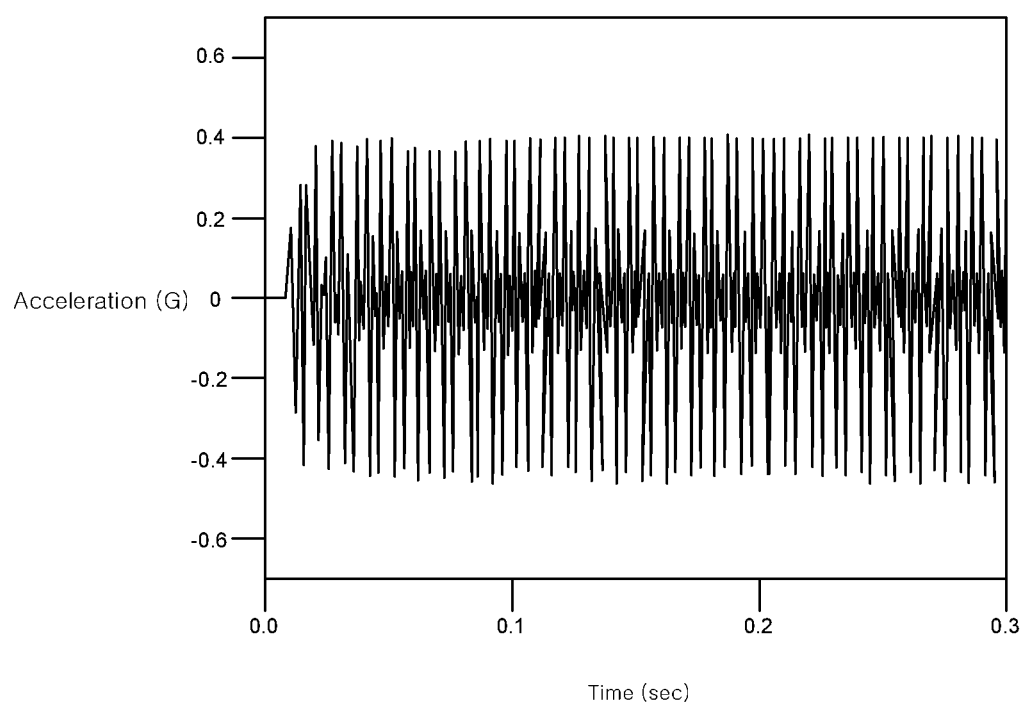

FIGS. 3A, 3B, and 3C are graphs obtained by measuring a vibration acceleration of a touch sensitive element of a first exemplary embodiment, a first comparative embodiment, and a second comparative embodiment. When FIGS. 3A and 3B are compared, it was confirmed that the first exemplary embodiment represented a vibration acceleration of approximately 0.9 G and the first comparative embodiment represented a vibration acceleration of approximately 0.6 G. That is, it was confirmed that the touch sensitive element according to the first exemplary embodiment in which the hard coating layer having a negative coefficient of thermal expansion was formed had significantly higher vibration acceleration at the same voltage as compared with the first comparative embodiment in which the hard coating layer was not formed. In other words, it was confirmed that at the same applied voltage, a vibration level of the touch sensitive element according to the first exemplary embodiment needed to be high. It was also confirmed that in order to obtain the same vibration level, a lower voltage was required for the first exemplary embodiment as compared with the first comparative embodiment.

Further, when FIGS. 3A and 3C were compared, it was confirmed that in the second comparative embodiment, the vibration acceleration was approximately 0.5 G.

When the first exemplary embodiment and the second comparative embodiment, it was confirmed that when the hard coating layer having a negative coefficient of thermal expansion was disposed above the electroactive layer and the electrode, the vibration acceleration was significantly high as compared with a case when the hard coating layer was disposed between the electroactive layer and the electrode. It was confirmed that when the hard coating layer was disposed between the electroactive layer and the electrode, the vibration acceleration was reduced as compared with the first comparative embodiment in which the hard coating layer was not disposed. This is because even though the compressive force is generated on the surface portion of the electroactive layer so that the vibration force which is transmitted to a vertical direction of the electroactive layer is increased, the hard coating layer having a low permittivity is disposed between the electrodes and the electroactive layer, so that the vibration level of the touch sensitive element is lowered.

As described above, a hard coating layer having a negative coefficient of thermal expansion is disposed above the electroactive layer which is formed of an electroactive polymer having a positive coefficient of thermal expansion and the electrode so that the vibration level of the touch sensitive element is significantly improved and a protective layer having an excellent hardness is provided on an exterior appearance of the touch sensitive element. Therefore, the touch sensitive element according to an exemplary embodiment of the present disclosure has an improved impact resistance and also transmits direct vibration feeling to the user.

Figure 4:
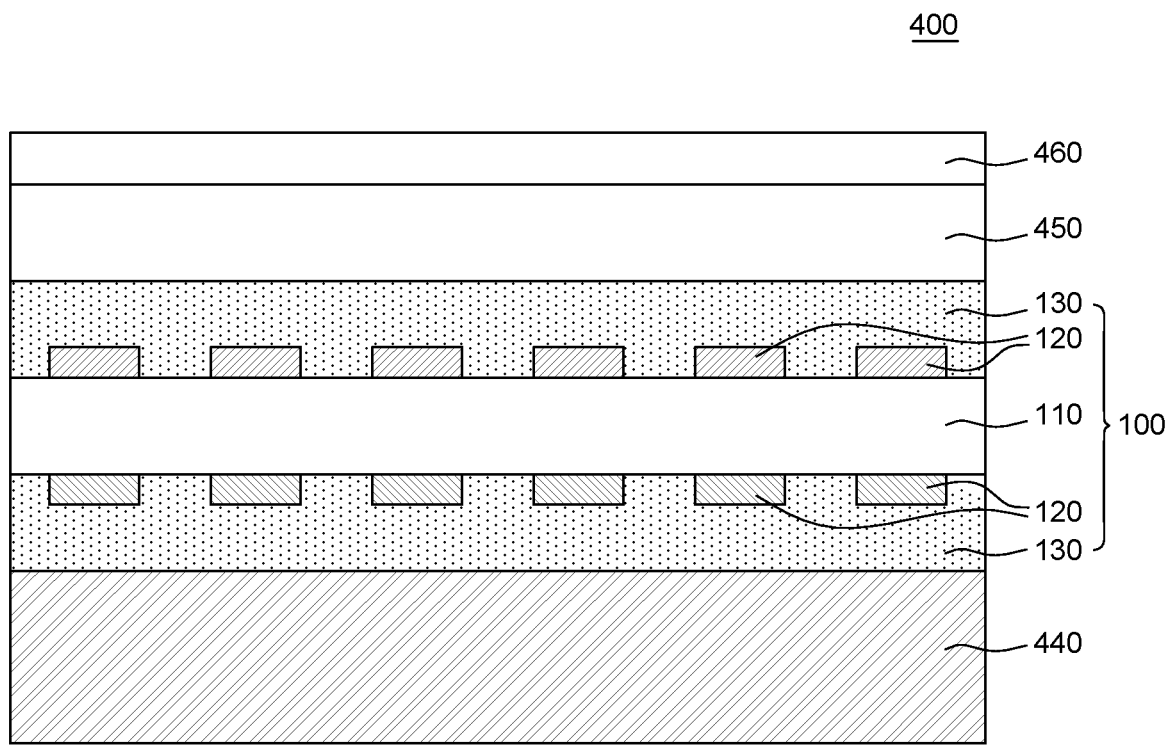
FIG. 4 is a schematic cross-sectional view for explaining a display device including a touch sensitive element according to an exemplary embodiment of the present disclosure.

FIG. 4 is a schematic cross-sectional view for explaining a display device including a touch sensitive element according to an exemplary embodiment of the present disclosure. Referring to FIG. 4, a display device 400 includes a display panel 440, a contact sensitive device 100, a touch panel 450, and a cover 460. In this case, the touch sensitive element 100 included in the display device 400 of FIG. 4 is the same as the touch sensitive element 100 according to the exemplary embodiment of the present disclosure which has been described with reference to FIG. 1A. Therefore, a redundant description of the touch sensitive element 100 will be omitted.

The display panel 440 refers to a panel in which a display element for displaying an image in the display device 400 is disposed. As the display panel 440, for example, various display panels such as an organic light emitting display panel, a liquid crystal display panel, and an electrophoretic display panel may be used.

On the display panel 440, the touch sensitive element 100 including an electroactive layer 110, an electrode 120, and a hard coating layer 130 is disposed. Hereinafter, it will be described that the touch sensitive element illustrated in FIG. 4 is the touch sensitive element 100 illustrated in FIG. 1A. Specifically, the touch sensitive element 100 includes an electroactive layer 110 which is formed of an electroactive polymer, an electrode 120 which is disposed on at least one surface of the electroactive layer 110, and a hard coating layer 130 which is disposed on the electroactive layer and the electrode 120 and has a negative coefficient of thermal expansion.

A touch panel 450 is disposed on the touch sensitive element 100. The touch panel 450 refers to a panel which senses a user's touch input to the display device 400. As the touch panel 450, for example, a capacitive type, a resistive overlay type, an ultrasonic type, or an infrared type may be used, but a capacitive type touch panel may be used as the touch panel 450. The display device 400 illustrated in FIG. 4 includes an add-on type touch panel 450 in which a separately manufactured touch panel 450 is separately disposed on the display panel 440.

A cover 460 is disposed on the touch panel 450. The cover 460 is a configuration for protecting the display device from an impact from the outside of the display device 400. The cover 460 may be formed of a transparent insulating material.

Even though not illustrated in FIG. 4, an adhesive layer may be used to bond the display panel 440, the touch sensitive element 100, the touch panel 450, and the cover 460 to each other. As the adhesive layer, for example, an optical clear adhesive (OCA) or an optical clear resin (OCR) may be used, but the adhesive layer is not limited thereto.

Generally, the touch sensitive element including the electroactive layer formed of an electroactive polymer has an excellent transparency, but has a lower vibration level than that of the touch sensitive element of the related art. Therefore, a driving voltage which is too high to introduce a touch sensitive element in a small display device such as a mobile device is required. However, the display device according to the exemplary embodiment of the present disclosure uses a touch sensitive element which is transparent and has an improved vibration level so that the driving voltage may be lowered.

Figure 5:
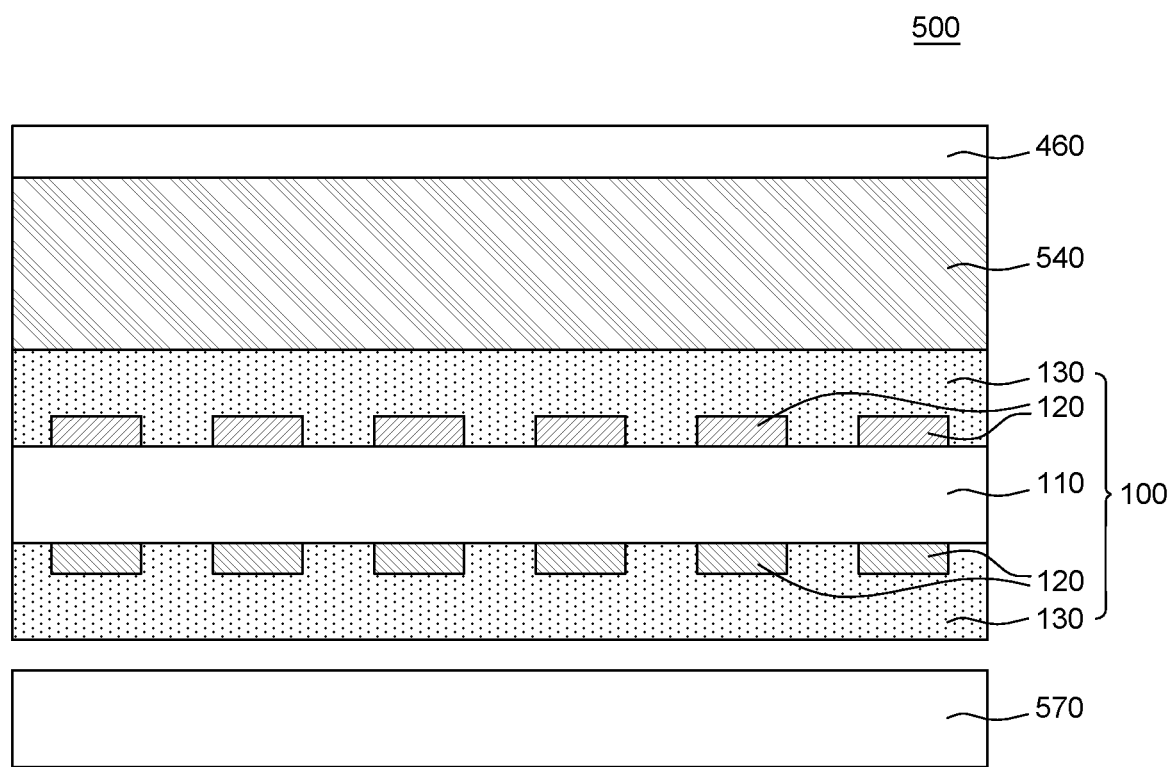
FIG. 5 is a schematic cross-sectional view for explaining a display device including a touch sensitive element according to another exemplary embodiment of the present disclosure.

FIG. 5 is a schematic cross-sectional view for explaining a display device including a touch sensitive element according to another exemplary embodiment of the present disclosure. When a display device 500 illustrated in FIG. 5 is compared with the display device 400 which has been described with reference to FIG. 4, except that the display panel 540 is a liquid crystal display panel and thus a backlight unit is further included and an in-cell type touch sensor in which a touch sensor other than the separate touch panel is provided to be integrated with the display panel 540 is configured, other components are substantially the same, so that the redundant description will be omitted.

Referring to FIG. 5, the display panel 540 is disposed between the cover 460 and the touch sensitive element 100. The liquid crystal display panel displays an image by adjusting transmittance of the light emitted from the backlight unit 570. The liquid display panel includes a lower polarizer, a lower substrate including a thin film transistor (TFT), a liquid crystal layer, an upper substrate including a color filter, and an upper polarizer, but is not limited thereto.

The display panel 540 is a panel in which a display device for displaying an image in the display device 500 is disposed and includes a touch sensor configured to be integrated in the panel. That is, the touch sensor is disposed in the display panel 540 to configure an in-cell touch sensor. In the in-cell type touch sensor, a common electrode of the display panel 540 is simultaneously used as a touch electrode.

Since the display device 500 illustrated in FIG. 5 is a liquid crystal display device so that a backlight unit 570 which emits light toward the display panel 540 is disposed below the display panel 540.

Between the display panel 540 and the back light unit 570, the touch sensitive element 100 including an electroactive layer 110, an electrode 120, and a hard coating layer 130 is disposed.

Generally, when the display panel is a liquid crystal display panel and an in-cell type touch sensor is integrated with the display panel, if the touch sensitive element is disposed on the touch sensor, the touch input may be erroneously recognized due to a noise which may be generated by a high driving voltage applied to the touch sensitive element. Therefore, the touch sensitive element may be disposed below the display panel. However, when the touch sensitive element is disposed below the display panel, since the user is located far away from the position to which the touch input is applied, the vibration level transmitted to the user is reduced. Therefore, in order to minimize the reduction of the vibration level, it is considered to dispose the touch sensitive element between the liquid crystal display panel and the backlight unit. However, as described above, there is a problem in that the shape memory alloy or the piezoelectric ceramics used in the touch sensitive element of the related art has low light transmittance. In the display device 500 according to another exemplary embodiment of the present disclosure, a hard coating layer having a negative coefficient of thermal expansion is disposed on the electroactive layer formed of an electroactive polymer and the electrode so that the transparency is excellent and the vibration level is improved. Therefore, even though the touch sensitive element 100 is disposed between the liquid crystal display panel and the backlight unit, the light transmittance of the light supplied from the backlight unit to the liquid crystal display panel is excellent and stronger vibration may be transmitted than in the case of using the electroactive polymer in the related art.

The exemplary embodiments of the present disclosure can also be described as follows:

According to an aspect of the present disclosure, a touch sensitive element includes an electroactive layer which is formed of electroactive polymer (EAP), an electrode which is disposed on at least one surface of the electroactive layer, and a hard coating layer which is disposed on the electroactive layer and the electrode and has a negative coefficient of thermal expansion (CTE).

The electroactive layer may have a positive coefficient of thermal expansion.

The hard coating layer may include ecucryptite or spodumen which is formed of silica ($SiO_2$), alumina ($Al_2O_3$), and lithium oxide ($Li_2O$).

The hard coating layer may include at least one of zirconium tungstate ($ZrW_2O_8$), hafnium tungstate ($HfW_2O_8$), zirconium molybdate ($ZrMO_2O_8$), and hafnium molybdate ($HfMO_2O_8$).

The hard coating layer may be formed by a heat treatment process of repeatedly treating the low temperature and the high temperature.

The electroactive layer may be formed of a center portion, an upper surface portion above the center portion, and a lower surface portion below the center portion, and when a voltage is not applied to the electrode, the center portion receives tensile force and the upper surface portion and the lower surface portion receive compressive force.

A thickness of the hard coating layer may be 10 nm to 200 nm.

The hard coating layer may cover surfaces of the electrode and the electroactive layer.

According to another aspect of the present disclosure, a display device includes a display panel and a touch sensitive element above or below the display panel, in which the touch sensitive element includes an electroactive layer formed of an electroactive polymer, an electrode which is disposed on at least one surface of the electroactive layer, and a hard coating layer which is disposed on the electroactive layer and the electrode and has a negative coefficient of thermal expansion.

The electroactive layer may have a positive coefficient of thermal expansion.

The display device may further include an add-on type touch panel which is separately disposed on the display panel and the touch sensitive element may be disposed between the display panel and the touch panel.

The display panel may be a liquid crystal display panel including a touch sensor which is configured to be integrated in the display panel, a backlight unit disposed below the liquid crystal display panel may be further included, and the touch sensitive element may be disposed between the liquid crystal display panel and the backlight unit.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical spirit of the present disclosure. The scope of the technical spirit of the present disclosure is not limited thereto. The protective scope of the present disclosure should be construed based on the following claims, and all the technical concepts in the equivalent scope thereof should be construed as falling within the scope of the present disclosure.

What is claimed is:

1. A touch sensitive element, comprising:
   an electroactive layer which is formed of electroactive polymer (EAP) and has a positive coefficient of thermal expansion (CTE);
   a plurality of electrodes which are respectively disposed on an upper surface and a lower surface of the electroactive layer; and
   a hard coating layer which is disposed on the electroactive layer and the plurality of electrodes and has a negative coefficient of thermal expansion (CTE), at least a portion of the hard coating layer in direct contact with the upper surface and the lower surface of the electroactive layer,
   wherein the electroactive layer is formed of a center portion, an upper surface portion above the center portion, and a lower surface portion below the center portion, and
   when a voltage is not applied to the plurality of electrodes, the center portion expands and the upper surface portion and the lower surface portion compresses.

2. The touch sensitive element according to claim 1, wherein the hard coating layer includes ecucryptite or spodumen which is formed of silica ($SiO_2$), alumina ($Al_2O_3$), and lithium oxide ($Li_2O$).

3. The touch sensitive element according to claim 1, wherein the hard coating layer includes at least one of zirconium tungstate ($ZrW_2O_8$), hafnium tungstate ($HfW_2O_8$), zirconium molybdate ($ZrMO_2O_8$), and hafnium molybdate ($HfMO_2O_8$).

4. The touch sensitive element according to claim 1, wherein the hard coating layer is formed by a heat treatment process of repeatedly treating low temperature and high temperature.

5. The touch sensitive element according to claim 1, wherein a thickness of the hard coating layer is 10 nm to 200 nm.

6. The touch sensitive element according to claim 1, wherein the hard coating layer covers surfaces of the plurality of electrodes and the electroactive layer.

7. The touch sensitive element according to claim 1, wherein the hard coating layer is also in contact with at least one of the plurality of electrodes.

8. The touch sensitive element according to claim 1, wherein the hard coating layer is disposed to cover a side of at least one of the plurality of electrodes.

9. The touch sensitive element according to claim 1, wherein at least one of the upper surface or the lower surface of the electroactive layer continually extends along a length of the electroactive layer.

10. The touch sensitive element of claim 9, wherein the portion of the hard coating layer is in direct contact with the plurality of electrodes.

11. A display device, comprising:
    a display panel; and
    a touch sensitive element above or below the display panel,
    wherein the touch sensitive element includes:
      an electroactive layer formed of an electroactive polymer and has a positive coefficient of thermal expansion (CTE);
      a plurality of electrodes which are respectively disposed on an upper surface and a lower surface of the electroactive layer; and
      a hard coating layer which is disposed on the electroactive layer and the plurality of electrodes and has a negative coefficient of thermal expansion, at least a portion of the hard coating layer in direct contact with the upper surface and the lower surface of the electroactive layer, wherein the electroactive layer is formed of a center portion, an upper surface portion above the center portion, and a lower surface portion below the center portion, and when a voltage is not applied to the plurality of electrodes, the center portion expands and the upper surface portion and the lower surface portion compresses.

12. The display device according to claim 11, further comprising:

an add-on type touch panel which is separately disposed on the display panel,
wherein the touch sensitive element is disposed between the display panel and the touch panel.

13. The display device according to claim 11, wherein the display panel is a liquid crystal display panel including a touch sensor which is configured to be integrated in the display panel, a backlight unit disposed below the liquid crystal display panel is further included, and the touch sensitive element is disposed between the liquid crystal display panel and the backlight unit.

14. The display device according to claim 11, wherein the hard coating layer is also in contact with at least one of the plurality of electrodes.

15. The display device according to claim 11, wherein the hard coating layer is disposed to cover a side of at least one of the plurality of electrodes.

* * * * *